US010825057B2

(12) United States Patent
Dhar et al.

(10) Patent No.: US 10,825,057 B2
(45) Date of Patent: Nov. 3, 2020

(54) METHOD AND SYSTEM FOR DISPLAYING TARGETED CONTENT ON A DIGITAL SIGNAGE BOARD

(71) Applicant: Conduent Business Services, LLC, Dallas, TX (US)

(72) Inventors: Aritra Dhar, Konnagar (IN); Shailesh Vaya, Bangalore (IN); Atul Singh, Bangalore (IN); Bhupendra Singh Solanki, Indore (IN); Shubhi Sharma, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 513 days.

(21) Appl. No.: 15/184,145

(22) Filed: Jun. 16, 2016

(65) Prior Publication Data
US 2017/0364956 A1 Dec. 21, 2017

(51) Int. Cl.
*G06Q 30/00* (2012.01)
*G06Q 30/02* (2012.01)
(Continued)

(52) U.S. Cl.
CPC ..... *G06Q 30/0269* (2013.01); *G06Q 30/0261* (2013.01); *H04L 63/102* (2013.01);
(Continued)

(58) Field of Classification Search
CPC .......... G06Q 30/0269; G06Q 30/0261; G06Q 2220/00; H04L 63/102; H04L 63/104; H04L 63/107; H04L 67/306; H04W 4/023
(Continued)

(56) References Cited

U.S. PATENT DOCUMENTS

| 8,170,914 B2 | 5/2012 | Mongeau et al. |
| 8,260,663 B1 | 9/2012 | Ranka et al. |

(Continued)

FOREIGN PATENT DOCUMENTS

| EP | 2704085 A1 | 3/2014 | |
| JP | 2003140588 A | * 5/2003 | ........... G09F 21/048 |

(Continued)

OTHER PUBLICATIONS

DSEG. Digital Sign Certified Expert Certification Program. (Jan. 1, 2016). Retrieved online Jul. 5, 2020. http://dseg.org/wp-content/uploads/2015/12/DSCEweb.pdf (Year: 2016).*

(Continued)

*Primary Examiner* — James A Reagan
(74) *Attorney, Agent, or Firm* — Jones Robb, PLLC

(57) ABSTRACT

The disclosed embodiments illustrate methods for displaying targeted content on a digital signage board (DSB). The method includes receiving encrypted profile information from each of a plurality of user-computing devices when the plurality of user-computing devices is in a proximity range of the DSB, wherein the DSB is associated with one or more products and/or services. The method further includes aggregating the encrypted profile information received from each of the plurality of user-computing devices to generate an aggregated encrypted profile. Further, the method includes transmitting the aggregated encrypted profile to a content server, wherein the content server decrypts the aggregated encrypted profile to select the targeted content from a content repository associated with the one or more products and/or services, wherein the targeted content is displayed on the DSB.

16 Claims, 8 Drawing Sheets

(51) Int. Cl.
*H04W 4/02* (2018.01)
*H04L 29/06* (2006.01)
*H04L 29/08* (2006.01)

(52) U.S. Cl.
CPC .......... *H04L 63/104* (2013.01); *H04L 63/107* (2013.01); *H04W 4/023* (2013.01); *G06Q 2220/00* (2013.01); *H04L 67/306* (2013.01)

(58) Field of Classification Search
USPC .................................................... 705/51, 50
See application file for complete search history.

(56) References Cited

U.S. PATENT DOCUMENTS

| | | |
|---|---|---|
| 2002/0026345 A1 | 2/2002 | Juels |
| 2003/0220830 A1 | 11/2003 | Myr |
| 2007/0067297 A1* | 3/2007 | Kublickis ............. G06Q 20/29 |
| 2007/0112762 A1* | 5/2007 | Brubaker ............. G06Q 30/02 |
| 2008/0015927 A1* | 1/2008 | Ramirez ............... G06Q 30/02 |
| | | 705/7.29 |
| 2009/0106082 A1 | 4/2009 | Senti et al. |
| 2011/0264501 A1* | 10/2011 | Clyne ................... G06Q 10/02 |
| | | 705/14.25 |
| 2012/0066231 A1* | 3/2012 | Petersen ............... G06Q 30/02 |
| | | 707/748 |
| 2013/0073388 A1* | 3/2013 | Heath ................... G06Q 30/02 |
| | | 705/14.53 |
| 2014/0085179 A1* | 3/2014 | Krig ....................... G06F 3/017 |
| | | 345/156 |
| 2014/0164131 A1 | 6/2014 | Kim et al. |
| 2014/0213300 A1* | 7/2014 | Spears .................... H04W 8/18 |
| | | 455/456.3 |
| 2014/0214543 A1 | 7/2014 | Gandhi |
| 2014/0304072 A1 | 10/2014 | Rider et al. |
| 2015/0081617 A1* | 3/2015 | Shaik ................. G06Q 30/0241 |
| | | 707/602 |
| 2015/0277849 A1* | 10/2015 | Beaumier ............ G06F 16/632 |
| | | 715/716 |
| 2015/0372808 A1* | 12/2015 | Bilogrevic .............. H04L 9/085 |
| | | 380/279 |

FOREIGN PATENT DOCUMENTS

| | | | | |
|---|---|---|---|---|
| WO | WO-2067580 A1 * | 8/2002 | ............ | H04N 5/445 |
| WO | WO 2009031053 A2 | 3/2009 | | |
| WO | WO-2010097807 A2 * | 9/2010 | ............ | G06Q 30/02 |
| WO | WO 2012144962 A1 | 10/2012 | | |

OTHER PUBLICATIONS

INTEL. Getting Started in Digital Signage: A Step-by-Step Guide. (Jan 17, 2014). Retrieved online Jul. 5, 2020. https://www.intel.com/content/dam/www/public/us/en/documents/guides/digital-signage-step-by-step-guide.pdf (Year: 2014).*

FHWA. Driver Visual Behavior in the Presence of Commercial Electronic Variable Message Signs (CEVMS). (Sep. 2012). Retrieved online Jul. 5, 2020. http://commb.ca/wp-content/uploads/2016/03/Driver-Visual-Behaviour-Electronic-Variable-Signs-Study.pdf (Year: 2012).*

* cited by examiner

METHOD AND SYSTEM FOR DISPLAYING TARGETED CONTENT ON A DIGITAL SIGNAGE BOARD

TECHNICAL FIELD

The presently disclosed embodiments are related, in general, to data processing. More particularly, the presently disclosed embodiments are related to methods and systems for displaying targeted content on a digital signage board (DSB).

BACKGROUND

Past decade has witnessed a plethora of revolutionary and advanced techniques, such as digital signage board (DSB)-based solutions, in the field of commercial display technologies, The DSB-based solutions offer DSBs are one of the most attractive medium by which multimedia content (associated with advertisements and promotions) is displayed to a relevant audience in prominent public geographical areas.

Most DSB-based solutions are operable to display multimedia content based on the basic features of user profiles of near-by users. However, such DSB-based solutions do not guarantee the privacy of the users around a DSB, as the user profiles of the users may be compromised or may be known by a DSB manager. Therefore, an advanced technique may be desired by which users' activities can be tracked and user profile information can be utilized for displaying targeted multimedia content on the DSBs without compromising on confidentiality and/or violating privacy.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method displaying targeted content on a DSB. The method includes receiving, by one or more transceivers in a server, encrypted profile information from each of a plurality of user-computing devices when the plurality of user-computing devices is in a proximity range of the DSB, wherein the DSB is associated with one or more products and/or services. The method further includes aggregating, by one or more processors in the server, the encrypted profile information received from each of the plurality of user-computing devices to generate an aggregated encrypted profile. The method further includes transmitting, by the one or more transceivers in the server, the aggregated encrypted profile to a content server, wherein the content server decrypts the aggregated encrypted profile to select the targeted content from a content repository associated with the one or more products and/or services, wherein the targeted content is displayed on the DSB.

According to embodiments illustrated herein, there is provided a method displaying targeted content on a DSB. The method includes receiving, by one or more transceivers in a content server, an aggregated encrypted profile from a server, wherein the server aggregates encrypted profile information received from each of a plurality of user-computing devices to generate the aggregated encrypted profile when the plurality of user-computing devices is in a proximity range of the DSB, wherein the DSB is associated with one or more products and/or services. The method further includes decrypting, by one or more processors in the content server, the aggregated encrypted profile to select the targeted content from a content repository associated with the one or more products and/or services. The method further includes rendering, by the one or more processors in the content server, the selected targeted content through a user interface displayed on the DSB.

According to embodiments illustrated herein, there is provided a system of displaying targeted content on a DSB. The system includes one or more processors configured to receive encrypted profile information, by utilizing one or more transceivers in the server, from each of a plurality of user-computing devices when the plurality of user-computing devices is in a proximity range of the DSB, wherein the DSB is associated with one or more products and/or services. The system includes one or more processors further configured to aggregate the encrypted profile information received from each of the plurality of user-computing devices to generate an aggregated encrypted profile. The system includes one or more processors further configured to transmit the aggregated encrypted profile to a content server by utilizing the one or more transceivers in the server, wherein the content server decrypts the aggregated encrypted profile to select the targeted content from a content repository associated with the one or more products and/or services, wherein the targeted content is displayed on the DSB.

According to embodiments illustrated herein, there is provided a system of displaying targeted content on a DSB. The system includes one or more processors configured to receive an aggregated encrypted profile from a server by utilizing one or more transceivers in the content server, wherein the server aggregates encrypted profile information received from each of a plurality of user-computing devices to generate the aggregated encrypted profile when the plurality of user-computing devices is in a proximity range of the DSB, wherein the DSB is associated with one or more products and/or services. The system includes one or more processors further configured to decrypt the aggregated encrypted profile to select the targeted content from a content repository associated with the one or more products and/or services. The system includes one or more processors further configured to render the selected targeted content through a user interface displayed on the DSB.

According to embodiments illustrated herein, there is provided a computer program product for use with a computing device. The computer program product comprises a non-transitory computer readable medium storing a computer program code for displaying targeted content on a DSB. The computer program code is executable by one or more processors to receive encrypted profile information, by utilizing one or more transceivers in the server, from a plurality of user-computing devices when the plurality of user-computing devices is in a proximity range of the DSB, wherein the DSB is associated with one or more products and/or services. The computer program code is further executable by one or more processors to aggregate the encrypted profile information received from each of the plurality of user-computing devices to generate an aggregated encrypted profile. The computer program code is further executable by one or more processors to transmit the aggregated encrypted profile to a content server by utilizing the one or more transceivers in the server, wherein the content server decrypts the aggregated encrypted profile to select the targeted content from a content repository associated with the one or more products and/or services, wherein the targeted content is displayed on the DSB.

According to embodiments illustrated herein, there is provided a computer program product for use with a computing device. The computer program product comprises a non-transitory computer readable medium storing a computer program code for displaying targeted content on a DSB. The computer program code is executable by one or more processors to receive an aggregated encrypted profile from a server by utilizing one or more transceivers in the content server, wherein the server aggregates encrypted profile information received from a plurality of user-computing devices to generate the aggregated encrypted profile when the plurality of user-computing devices is in a proximity range of the DSB, wherein the DSB is associated with one or more products and/or services. The computer program code is further executable by one or more processors to decrypt the aggregated encrypted profile to select the targeted content from a content repository associated with the one or more products and/or services. The computer program code is further executable by one or more processors to render the selected targeted content through a user interface displayed on the DSB.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
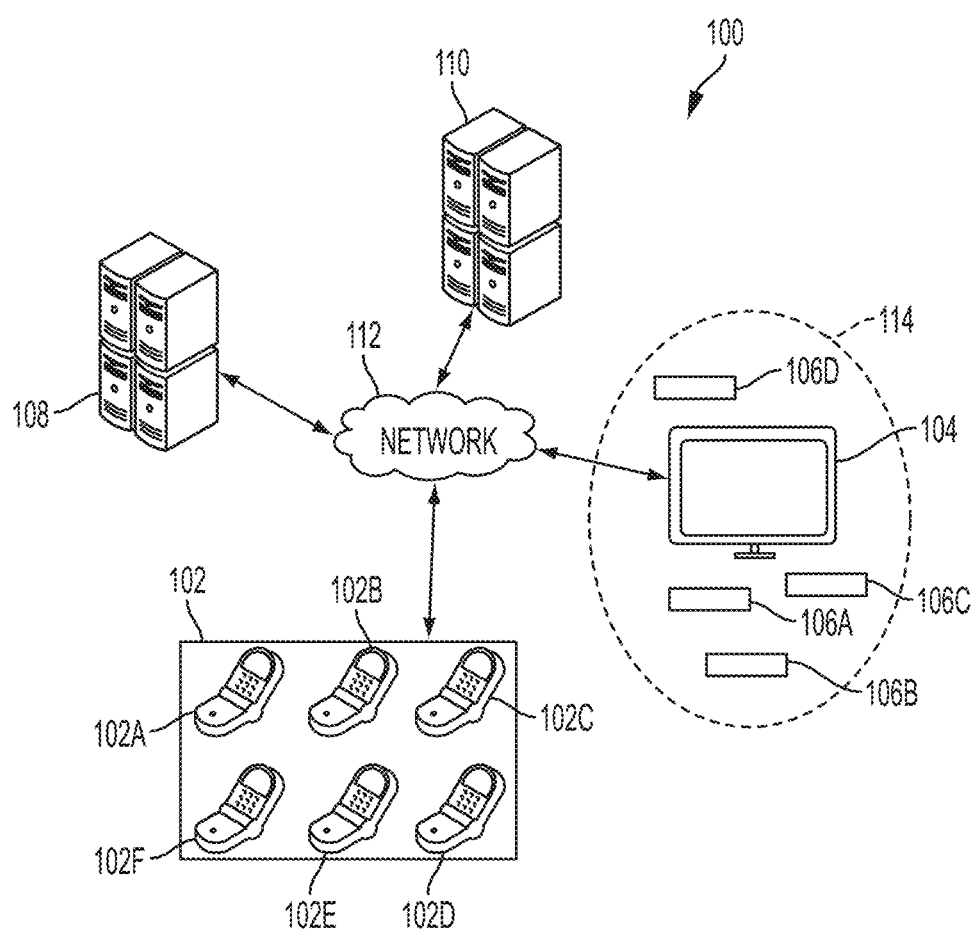
FIG. 1 is a block diagram that illustrates a system environment, in which various embodiments can be implemented, in accordance with at least one embodiment.

The present disclosure is best understood with reference to the detailed figures and description set forth herein.

Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions

The following terms shall have, for the purposes of this application, the meanings set forth below.

A "user-computing device" refers to a computer, a device (that includes one or more processors/microcontrollers and/or any other electronic components), or a system (that performs one or more operations according to one or more programming instructions/codes) associated with a user. In an embodiment, one or more sensors may be installed in the user-computing device. Examples of the user-computing device may include, but are not limited to, a desktop computer, a laptop, a personal digital assistant (PDA), a mobile device, a smartphone, and a tablet computer (e.g., iPad® and Samsung Galaxy Tab®).

A "digital signage board (DSB)" refers to a display device that is used to display content, such as an advertisement, a notification, a direction, and/or the like. In an embodiment, the DSB is located in a public place, such as a retail store, a shopping complex, a stadium, a hotel, a corporate building, and/or the like. In an embodiment, the DSB is associated with one or more products and/or services that are in a proximity range of the DSB. In an embodiment, the DSB is utilized to display targeted content associated with the one or more products and/or services to a plurality of users when the plurality of users is within the proximity range of the DSB. In an embodiment, the DSB is integrated with an interactive user interface, such as a touch screen that allows the user to interact with the DSB.

A "proximity range" refers to a communication range associated with a device. In an embodiment, two devices may be able to communicate with each other only if they are within the proximity range of each other. In an embodiment, the proximity range of a device may depend on one or more sensors installed in the device for communication. In an embodiment, the device may correspond to a DSB, a user-computing device and/or the like. For example, a DSB with a proximity range of "200 ft" may detect the presence of a mobile phone that is within a radius of "200 ft" from the DSB.

"One or more products and/or services" refer to one or more commodities and/or facilities that may be required/utilized/availed by a user. In an embodiment, a user profile of the user may be maintained by a user-computing device associated with the user, based on one or more activities of the user related to the one or more products and/or services. In an embodiment, a DSB may be associated with the one or more products and/or services that are available within the proximity range of the DSB. Examples of the products may include groceries, watches, sports-equipment, jewelry, apparels, and/or the like. Examples of the services may include financial services, healthcare services, education services, and/or the like.

A "user profile" refers to the profile associated with a user that includes one or more preferences of the user towards one or more products and/or services. In an embodiment, the user profile of the user may further comprise a static user profile and a dynamic user profile. The static user profile includes one or more of: demographic attributes (such as age, gender, and/or the like), sports-related activities (such as average time of cycling, indoor sports preference, and/or the like), and health-related information (such as height, weight, blood group and/or the like) of the user. The dynamic profile includes one or more activities of the user related to the one or more products and/or services. Further, a weight is assigned to each of the one or more products and/or services in the dynamic profile, based on the activities of the user related to the one or more products and/or services.

"One or more activities" of a user refers to one or more actions of a user related to one or more products and/or services. In an embodiment, the one or more activities may include purchasing a product, availing a service, showing interest in the product and/or the service on a website and/or the like.

"Targeted content" refers to specific content that may be of interest to a user. In an embodiment, the targeted content may be determined, based on a user profile of the user. In an embodiment, the targeted content may be associated with consolidated preferences, such as an aggregated encrypted profile, of more than one users. In an embodiment, the targeted content may be rendered on a DSB. Examples of the targeted content may include, but are not limited to, advertisements, offers, discounts, and/or coupons.

"Encryption" refers to a process of encoding content using one or more encryption algorithms. The encryption process generates a cipher-text of the content that can only be read when decrypted. In an embodiment, a user may require an encryption key to encrypt the content.

"Decryption" refers to a process of converting encrypted content into content that can be read and understood by a user. In an embodiment, the user may require a decryption key to decrypt the encrypted content.

A "weight" corresponds to a measure of likelihood associated with one or more activities of a user related to one or more products and/or services. In an embodiment, the weight is indicative of the likelihood of the user to purchase the one or more products and/or avail the one or more services.

A "set of rules" refers to one or more conditions based on which two or more products and/or services are associated with each other. In an embodiment, the set of rules may be utilized to determine a weight for a product and/or service in a user profile of a user. For example, in a user profile of a user a product, "mobile phone" is associated with a product "mobile phone accessories" based on the set of rules. The user may have recently purchased a new mobile phone. In this scenario, based on the set of rules a higher weight may be assigned to the product "mobile phone accessories" in the user profile of the user and the weight of the product "mobile phone" may be decreased. These values may be assigned because the user, who purchased the new mobile phone is more likely to purchase mobile phone accessories for the new mobile phone than purchase to another mobile phone.

"Aggregation" refers to a technique of combining information from multiple sources and generating aggregated information. In an embodiment, the information from multiple sources may be aggregated to maintain data privacy and security. In an embodiment, the information from multiple sources may correspond to encrypted information. In an embodiment, the aggregated information represents a consolidated preference of the multiple sources. In an embodiment, one or more aggregation algorithms may be utilized to aggregate the information. Examples of the one or more aggregation algorithms may include, but are not limited to, homomorphic aggregation algorithm, and/or binary aggregation.

An "aggregated encrypted profile" refers to an encrypted profile that represents consolidated statistical data associated with a plurality of users. In an embodiment, the aggregated encrypted profile may correspond to combined preferences of the plurality of users. In an embodiment, the aggregated encrypted profile may be generated by aggregating encrypted profiles of the plurality of users. In an alternate embodiment, the aggregated encrypted profile may be generated by aggregating encrypted profile information selected from the encrypted profile of each of the plurality of users.

FIG. 1 is a block diagram of a system environment in which various embodiments may be implemented. With reference to FIG. 1, there is shown a system environment 100 that includes a plurality of user-computing devices 102, such as user-computing devices 102A to 102F, a DSB 104, one or more sections 106, such as sections 106A to 106D, a server 108, a content server 110, and a network 112. There is further shown a proximity range 114 of the DSB 104. Various devices in the system environment 100 may be interconnected over the network 112. FIG. 1 shows, for simplicity, one DSB, such as the DSB 104, one server, such as the server 108, and one content server, such as the content server 110. However, it will be apparent to a person having ordinary skill in the art that the disclosed embodiments may also be implemented using multiple DSBs, multiple servers, and multiple content servers, without departing from the scope of the disclosure.

The plurality of user-computing devices 102 refers to computing devices that comprise one or more processors and one or more memories. The one or more memories may include computer readable codes, instructions, or programs that are executable by the one or more processors to perform one or more first predetermined operations. Each of the plurality of user-computing devices 102 may comprise one or more sensors. Examples of the one or more sensors may include, but are not limited to, a Near Field Communication (NFC) sensor, a Bluetooth sensor and/or a Wireless Fidelity (Wi-Fi) sensor. In an embodiment, each of the plurality of user-computing devices 102 may include one or more installed applications or software programs, which may be utilized by a user to perform the one or more first predetermined operations. For example, the user-computing device 102A may include a Wi-Fi tab. The user may activate/select the Wi-Fi tab to connect to a local network, such as the network 112, which may be available at a public place, such as a shopping complex. In an embodiment, each of the plurality of user-computing devices 102 may be configured to determine a user profile of the corresponding user. For example, the user-computing device 102A may utilize the user's browsing history, user's profile on a social media platform (e.g., Facebook, Twitter, Google+, LinkedIn, and so forth), or other user inputs including personal information associated with the user, to determine the user profile. In an embodiment, the user profile may be stored in the corresponding user-computing device of the plurality of user-computing devices 102 in one or more data storage formats known in the art. Examples of the one or more data storage formats may include, but are not limited to, XML format.

In an embodiment, each of the plurality of user-computing devices 102 may be further configured to store a map data of a shopping complex. In an embodiment, the shopping complex may comprise the one or more sections 106. Example of the one or more sections may include, but are not limited to, a grocery section, an electronics section, and an apparels section. The map data comprises information pertaining to one or more geographical location coordinates of the DSBs in the shopping complex, and one or more products and/or services that are available in the one or more sections 106 that are within the proximity range 114 of the DSB 104. Further, the map data may be stored in the form of one or more spatial indices known in the art. Examples of the one or more spatial indices may include, but are not limited to, an r-tree, an r*-tree, and/or a binary tree.

In an embodiment, each of the plurality of user-computing devices 102 may select profile information from the user profile of the corresponding user stored at the corresponding user-computing device. The selection of the profile information is based on an association of the DSB 104 with the one or more products and/or services available at the one or more sections 106 within the proximity range 114. Further, the profile information is selected from the user profile when the corresponding user-computing device is within the proximity range 114 of the DSB 104. In an embodiment, the profile information is selected from the user profile stored in the corresponding user-computing device by utilizing the stored map data. In an embodiment, each of the plurality of user-computing devices 102 may be configured to perform one or more first predetermined operations. For example, each of the plurality of user-computing devices 102 may utilize one or more encryption algorithms known in the art to encrypt the selected profile information. In an embodiment, the plurality of user-computing devices 102 may be configured to transmit the encrypted profile information to the server 108.

The plurality of user-computing devices 102 may include a variety of computing devices such as, but not limited to, a laptop, a personal digital assistant (PDA), a tablet computer, a smartphone, a phablet, and/or the like. One of the plurality of user-computing devices 102, i.e., the user-computing device 102A, has been discussed later in FIG. 2.

The DSB 104 may refer to a display device that is used to display targeted content. Examples of the targeted content may include, but are not limited to, advertisements, offers, discounts, and/or coupons. The DSB 104 may include one or more processors in communication with one or more memories. The one or more memories may include computer readable code that is executable by the one or more processors to perform one or more second predetermined operations. The one or more second predetermined operations may include transmitting a metadata to each of the plurality of user-computing devices 102 that is within the proximity range 114 of the DSB. In an embodiment, the DSB 104 may be associated with a unique identification code and a fixed proximity range, such as the proximity range 114.

In an embodiment, the DSB 104 may be associated with the one or more products and/or services, which are available in the one or more sections 106, within the proximity range 114 of the DSB. For example, the DSB 104 may have a proximity range of "330 ft." The DSB 104 may be associated with one or more sections that may be encompassed within a radius of "330 ft" from the DSB 104. In this scenario, the one or more products and/or services available in the one or more sections 106 are further associated with the DSB 104. In an embodiment, information pertaining to identification codes, such as "Xpath Expressions," of the associated products and/or services may be stored in the DSB 104.

A person having ordinary skill in the art will understand that the scope of the abovementioned example is for illustrative purpose and should not be construed to limit the scope of the disclosure.

An embodiment of the structure of the DSB 104 has been discussed later in FIG. 3.

The server 108 refers to a computing device or a software framework hosting an application and/or a software service. In an embodiment, the server 108 may be implemented to execute procedures such as, but not limited to, programs, routines, or scripts stored in one or more memories for supporting the hosted application and/or the software service. In an embodiment, the application and/or the software service may be configured to perform one or more third predetermined operations. In an embodiment, the one or more third predetermined operations may include aggregating the encrypted profile information received from each of the plurality of user-computing devices 102 to generate an aggregated encrypted profile. In an embodiment, the server 108 may transmit the aggregated encrypted profile to the content server 110.

The server 108 may be realized through various types of application servers, such as a Java application server, a .NET framework application server, a Base4 application server, a PHP framework application server, or any other application server framework. Examples of the server 108 may include, but are not limited to, a relational database server, a SAP® server, PeopleSoft® server, and a Siebel® server. An embodiment of the structure of the server 108 has been discussed later in FIG. 4.

The content server 110 refers to a computing device including one or more processors and one or more memories. The one or more memories may include computer readable codes and instructions that may be executable by the one or more processors to perform one or more fourth predetermined operations. In an embodiment, the one or more fourth predetermined operations may include decryption of the aggregated encrypted profile received from the server 108.

In an embodiment, the content server 110 may utilize the decrypted aggregated profile to select the targeted content. In an embodiment, the content server 110 may further transmit the selected targeted content to the DSB 104.

The content server 110 may be realized through various types of application servers, such as a Java application server, a .NET framework application server, a Base4 application server, a PHP framework application server, or any other application server framework. Examples of the content server 110 may include, but not limited to, a relational database server, a SAP Server®, PeopleSoft® server, and a Siebel Server®. An embodiment of the structure of the content server 110 has been discussed later in FIG. 5.

The network 112 may include a medium through which devices, such as the plurality of user-computing devices 102, the DSB 104, the server 108, and the content server 110 may communicate with each other. Examples of the network 112 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the system environment 100 may be configured to connect to the network 112, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, and cellular communication protocols, such as Long Term Evolution (LTE), and/or Bluetooth (BT) communication protocols.

Figure 2:
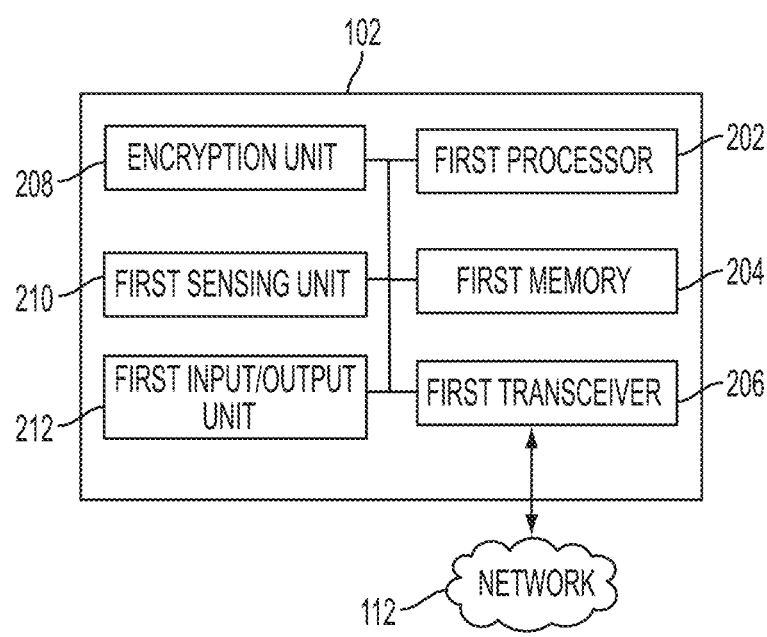
FIG. 2 is a block diagram that illustrates a user-computing device, in accordance with at least one embodiment.

FIG. 2 is a block diagram that illustrates a plurality of user-computing devices, in accordance with at least one embodiment. FIG. 2 has been described in conjunction with FIG. 1. With reference to FIG. 2, there is shown a block diagram of a user-computing device, such as the user-computing device 102A, of the plurality of user-computing devices 102. A person having ordinary skill in the art will understand that for brevity the block diagram is hereinafter explained with respect to the user-computing device 102A. Notwithstanding, the disclosure may not be so limited, and the block diagram may be further applicable to other user-computing devices, such as the user-computing devices 102B to 102F, of the plurality of user-computing devices 102, without deviating from the scope of the disclosure. With reference to FIG. 2, the user-computing device 102A may include a first processor 202, a first memory 204, a first transceiver 206, an encryption unit 208, a first sensing unit 210, and a first input/output unit 212.

The first processor 202 may be configured to execute one or more sets of instructions stored in the first memory 204. The first processor 202 is coupled to the first memory 204, the first transceiver 206, the encryption unit 208, the first sensing unit 210, and the first input/output unit 212. The first processor 202 may further comprise an arithmetic logic unit (ALU) (not shown) and a control unit (CU) (not shown). The ALU may be coupled to the CU. The ALU may be configured to perform one or more mathematical and logical operations and the CU may control the operation of the ALU. The first processor 202 may execute a set of instructions/programs/codes/scripts stored in the first memory 204 to perform the one or more first predetermined operations.

In an embodiment, the first processor 202 may be configured to determine the user profile of the user associated with the user-computing device 102A. Further, the first processor 202 may be configured to select the profile information from the user profile of the user. The first processor 202 may be implemented based on a number of processor technologies known in the art. Examples of the first processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The first memory 204 may be operable to store one or more machine codes, and/or computer programs having at least one code section executable by the first processor 202. The first memory 204 may store the one or more sets of instructions that are executable by the first processor 202, the first transceiver 206, the encryption unit 208, the first sensing unit 210, and the first input/output unit 212. In an embodiment, the first memory 204 may include one or more first buffers (not shown). The one or more first buffers may store the user profile of the user, the map data, and a set of rules. In an embodiment, the map data may be stored by utilizing the one or more spatial indices known in the art. Examples of the one or more spatial indices may include, but are not limited to, an r-tree, an r*-tree, and a binary tree. In an embodiment, the set of rules may be utilized for determining a weight for each of the one or more products and/or services in the user profile, based on the one or more preferences of the user towards each of the one or more products and/or services. Examples of some of the commonly known memory implementations may include, but are not limited to, a random access memory (RAM), a read only memory (ROM), a hard disk drive (HDD), and a secure digital (SD) card. In an embodiment, the first memory 204 may include the one or more machine codes, and/or computer programs that are executable by the first processor 202 to perform specific operations. It will be apparent to a person having ordinary skill in the art that the one or more instructions stored in the first memory 204 may enable the hardware of the user-computing device 102A to perform the one or more first predetermined operations.

The first transceiver 206 transmits/receives messages and data to/from various components, such as the DSB 104, the server 108, and the content server 110, of the system environment 100, over the network 112. In an embodiment, the first transceiver 206 may be communicatively coupled to the network 112. In an embodiment, the first transceiver 206 may be configured to receive the metadata from the DSB 104. Further, the first transceiver 206 may be configured to transmit the selected encrypted profile information to the server 108. Examples of the first transceiver 206 may include, but are not limited to, an antenna, an Ethernet port, a USB port, or any other port that can be configured to receive and transmit data. The first transceiver 206 receives and transmits the demands/content/information/notifications in accordance with the various communication protocols, such as, TCP/IP, UDP, and 2G, 3G, or 4G communication protocols.

The encryption unit 208 includes suitable logic, circuitry, and/or interfaces that are configured to execute the one or more sets of instructions stored in the first memory 204. In an embodiment, the encryption unit 208 may be configured to encrypt the user profile of the user. In an embodiment, the encryption unit 208 may be configured to encrypt the selected profile information. In an embodiment, the encryption unit 208 may utilize one or more encryption algorithms known in the art for encrypting the user profile and/or the selected profile information. Examples of the one or more encryption algorithms may include, but are not limited to, homomorphic encryption algorithm, Rivest-Shamir-Adleman (RSA) encryption algorithm, and Data Encryption Standard (DES) encryption algorithm. The encryption unit 208 may further utilize one or more encryption keys for encrypting the user profile and/or the selected profile information. In an embodiment, the encryption unit 208 may encrypt the user profile and/or the selected profile information by utilizing a public key of a service provider. In an embodiment, the encryption unit 208 may include one or more electronic circuits and/or gates that are capable of encrypting the user profile and/or the selected profile information. The encryption unit 208 may be realized through various electronic components, such as, but not limited to, a System-on-Chip (SoC) component, an ASIC component, or a Field Programmable Logical Array (FPGA) component.

Though the encryption unit 208 is depicted as a separate entity, a person skilled in the art will appreciate that the scope of the disclosure is not limited to realizing functionality of the encryption unit 208 through the first processor 202. In an embodiment, the encryption unit 208 may be implemented within the first processor 202 without departing from the spirit of the disclosure. Further, a person skilled in the art will understand that the scope of the disclosure is not limited to realizing the encryption unit 208 as a hardware component. In an embodiment, the encryption unit 208 may be implemented as a software module included in computer program code (stored in the first memory 204), which may be executable by the first processor 202 to perform the functionalities of the encryption unit 208.

The first sensing unit 210 includes suitable logic, circuitry, and/or interfaces that are configured to execute the one or more sets of instructions stored in the first memory 204 and perform device and/or data sensing accordingly. The first sensing unit 210 may be configured to communicate with the DSB 104 when the user-computing device 102A is within the proximity range 114 of the DSB 104. The first sensing unit 210 may comprise the one or more sensors. Examples of the one or more sensors may include, but are not limited to, an NFC sensor, a Bluetooth sensor, and/or a Wi-Fi sensor.

The first input/output unit 212 may comprise suitable logic, circuitry, interfaces, and/or code that may be configured to receive an input from the user to perform the one or more first predetermined operations. The first input/output unit 212 may be further configured to provide an output to the user. The first input/output unit 212 may be configured to communicate with the first processor 202. Examples of the input devices may include, but are not limited to, a keyboard, a mouse, a joystick, a touch screen, a microphone, a camera, and/or a docking station. Examples of the output devices include, but are not limited to, a display screen and/or a speaker.

Figure 3:
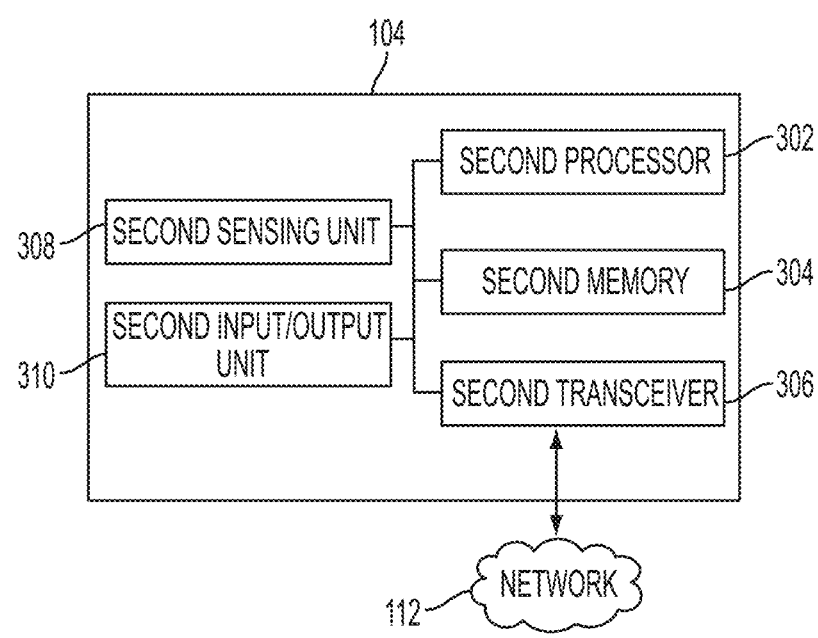
FIG. 3 is a block diagram that illustrates a DSB, in accordance with at least one embodiment.

FIG. 3 is a block diagram that illustrates a DSB, in accordance with at least one embodiment. FIG. 3 has been described in conjunction with FIG. 1. With reference to FIG. 3 there is shown the DSB 104 that may include a second processor 302, a second memory 304, a second transceiver 306, a second sensing unit 308, and a second input/output unit 310.

The second processor 302 may be configured to execute one or more sets of instructions stored in the second memory 304. The second processor 302 is coupled to the second memory 304, the second transceiver 306, the second sensing unit 308, and the second input/output unit 310. The second processor 302 may further comprise an ALU (not shown) and a CU (not shown). The ALU may be coupled to the CU. The ALU may be configured to perform one or more mathematical and logical operations and the CU may control the operation of the ALU. The second processor 302 may execute a set of instructions/programs/codes/scripts stored in the second memory 304 to perform the one or more second predetermined operations for displaying the targeted content. The second processor 302 may be implemented based on a number of processor technologies known in the art. Examples of second processor 302 may include, but are not limited to, an X86-based processor, a RISC processor, an ASIC processor, and/or a CISC processor.

The second memory 304 may be operable to store one or more machine codes, and/or computer programs having at least one code section executable by the second processor 302. The second memory 304 may store the one or more sets of instructions that are executable by the second processor 302, the second transceiver 306, the second sensing unit 308, and the second input/output unit 310. In an embodiment, the second memory 304 may include one or more second buffers (not shown). The one or more second buffers may store at least the unique identification of the DSB and information pertaining to the proximity range 114 of the DSB 104. In an embodiment, the one or more second buffers may further store information pertaining to the one or more products and/or services associated with the DSB 104. In an embodiment, the information pertaining to the one or more products and/or services may correspond to an identification code of each of the one or more products and/or services. Some of the commonly known memory implementations may include, but are not limited to, a RAM, a ROM, an HDD, and an SD card. In an embodiment, the second memory 304 may include the one or more machine codes, and/or computer programs that are executable by the second processor 302 to perform specific operations. It will be apparent to a person having ordinary skill in the art that the one or more instructions stored in the second memory 304 may enable the hardware of the DSB 104 to perform specific operations.

The second transceiver 306 transmits/receives messages and data to/from various components, such as the plurality of user-computing devices 102, the server 108, and the content server 110, of the system environment 100, over the network 112. In an embodiment, the second transceiver 306 may be communicatively coupled to the network 112. In an embodiment, the second transceiver 306 may transmit the metadata to each of the plurality of user-computing devices 102 within the proximity range of the DSB 104. In an embodiment, the second transceiver 306 may receive the targeted content from the content server 110. Examples of the second transceiver 306 may include, but are not limited to, an antenna, an Ethernet port, a USB port, or any other port that can be configured to receive and transmit data. The second transceiver 306 receives and transmits the demands/content/information/notifications in accordance with the various communication protocols, such as, TCP/IP, UDP, and 2G, 3G, or 4G communication protocols.

The second sensing unit 308 includes suitable logic, circuitry, and/or interfaces that are configured to execute the one or more sets of instructions stored in the second memory 304 and perform device and/or data sensing accordingly. The second sensing unit 308 may be configured to detect the presence of a user-computing device, such as 102A to 102F, when the user-computing device, such as 102A to 102F, is within the proximity range 114 of the DSB 104. The second sensing unit 308 may comprise the one or more sensors. Examples of the one or more sensors may include, but are not limited to, an NFC sensor, a Bluetooth sensor, and/or a Wi-Fi sensor.

The second input/output unit 310 may comprise suitable logic, circuitry, interfaces, and/or code that may be configured to receive an input from the user to perform the one or more second predetermined operations. The second input/output unit 310 may be further configured to provide an output to the user. The second input/output unit 310 may be configured to communicate with the second processor 302. Examples of the input devices may include, but are not limited to, a keyboard, a mouse, a joystick, a touch screen, a microphone, a camera, and/or a docking station. Examples of the output devices include, but are not limited to, a display screen and/or a speaker.

Figure 4:
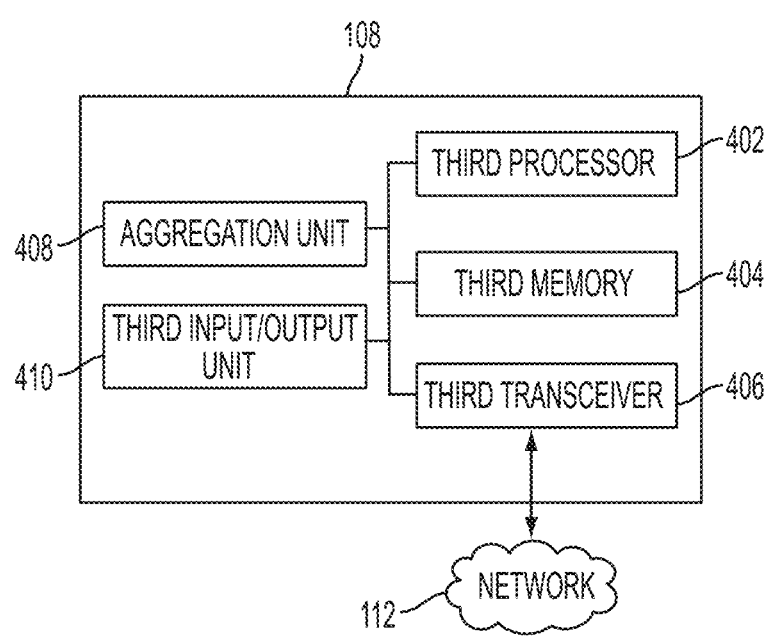
FIG. 4 is a block diagram that illustrates a server, in accordance with at least one embodiment.

FIG. 4 is a block diagram that illustrates a server, in accordance with at least one embodiment. FIG. 4 has been described in conjunction with FIG. 1. With reference to FIG. 4, there is shown the server 108 that may include a third processor 402, a third memory 404, a third transceiver 406, an aggregation unit 408, and a third input/output unit 410.

The third processor 402 may be configured to execute one or more sets of instructions stored in the third memory 404. The third processor 402 is coupled to the third memory 404, the third transceiver 406, the aggregation unit 408, and the third input/output unit 410. The third processor 402 may further comprise an ALU (not shown) and a CU (not shown). The ALU may be coupled to the CU. The ALU may be configured to perform one or more mathematical and logical operations and the CU may control the operation of the ALU. The third processor 402 may execute a set of instructions/programs/codes/scripts stored in the third memory 404 to perform the one or more third predetermined operations for aggregating the encrypted profile information received from each of the plurality of user-computing devices 102. The third processor 402 may be implemented based on a number of processor technologies known in the art. Examples of the third processor 402 may include, but are not limited to, an X86-based processor, a RISC processor, an ASIC processor, and/or a CISC processor.

The third memory 404 may be operable to store one or more machine codes, and/or computer programs having at least one code section executable by the third processor 402. The third memory 404 may store the one or more sets of instructions that are executable by the third processor 402, the third transceiver 406, the aggregation unit 408, and the third input/output unit 410. In an embodiment, the third memory 404 may include one or more third buffers (not shown). In an embodiment, the one or more third buffers may store one or more aggregation algorithms known in the art. Examples of the one or more aggregation algorithms may include, but are not limited to, homomorphic aggregation algorithm and/or binary aggregation algorithm. In an embodiment, the one or more third buffers may further store the aggregated encrypted profile. Examples of some of the commonly known memory implementations may include, but are not limited to, a RAM, a ROM, an HDD, and an SD card. In an embodiment, the third memory 404 may include the one or more machine codes, and/or computer programs that are executable by the third processor 402 to perform specific operations. It will be apparent to a person having ordinary skill in the art that the one or more instructions stored in the third memory 404 may enable the hardware of the server 108 to perform specific operations.

The third transceiver 406 transmits/receives messages and data to/from various components, such as the plurality of user-computing devices 102, the DSB 104, and the content server 110, of the system environment 100, over the network 112. In an embodiment, the third transceiver 406 may be communicatively coupled to the network 112. In an embodiment, the third transceiver 406 may receive the encrypted profile information from each of the plurality of user-computing devices 102. In an embodiment, the third transceiver 406 may further transmit the aggregated encrypted profile to the content server 110. Examples of the third transceiver 406 may include, but are not limited to, an antenna, an Ethernet port, a USB port, or any other port that can be configured to receive and transmit data. The third transceiver 406 receives and transmits the demands/content/information/notifications in accordance with the various communication protocols, such as, TCP/IP, UDP, and 2G, 3G, or 4G communication protocols.

The aggregation unit 408 includes suitable logic, circuitry, and/or interfaces that are configured to execute the one or more sets of instructions stored in the third memory 404. The aggregation unit 408 may be configured to aggregate the encrypted profile information received from each of the plurality of user-computing devices 102. In an embodiment, the aggregation unit 408 may utilize the one or more aggregation algorithms retrieved from the third memory 404 for aggregating the encrypted profile information received from each of the plurality of user-computing devices 102. Examples of the one or more aggregation algorithms retrieved from the third memory 404 may include, but are not limited to, the homomorphic aggregation algorithm and the binary aggregation algorithm. In an embodiment, the aggregation unit 408 may include one or more electronic circuits and/or gates that are capable of aggregating the encrypted profile information received from each of the plurality of user-computing devices 102. The aggregation unit 408 may be realized through various electronic components, such as, but not limited to, a SoC component, an ASIC component, or an FPGA component.

Though the aggregation unit 408 is depicted as a separate entity, a person skilled in the art will appreciate that the scope of the disclosure is not limited to realizing functionality of the aggregation unit 408 by the third processor 402. In an embodiment, the aggregation unit 408 may be implemented within the third processor 402 without departing from the spirit of the disclosure. Further, a person skilled in the art will understand that the scope of the disclosure is not limited to realizing the aggregation unit 408 as a hardware component. In an embodiment, the aggregation unit 408 may be implemented as a software module included in computer program code (stored in the third memory 404), which may be executable by the third processor 402 to perform the functionalities of the aggregation unit 408.

The third input/output unit 410 may comprise suitable logic, circuitry, interfaces, and/or code that may be configured to receive an input from the user to perform the one or more third predetermined operations. The third input/output unit 410 may be further configured to provide an output to the user. The third input/output unit 410 may be configured to communicate with the third processor 402. Examples of the input devices may include, but are not limited to, a keyboard, a mouse, a joystick, a touch screen, a microphone, a camera, and/or a docking station. Examples of the output devices include, but are not limited to, a display screen and/or a speaker.

Figure 5:
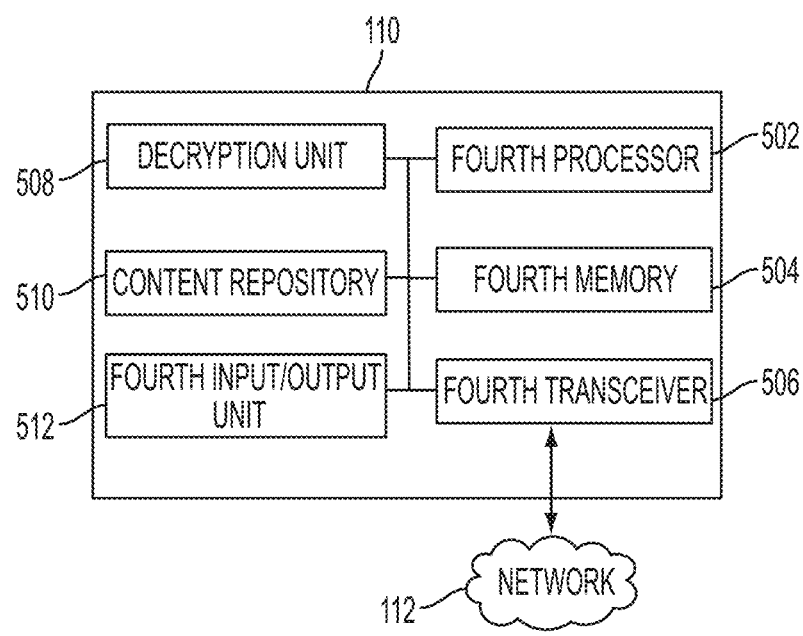
FIG. 5 is a block diagram that illustrates a content server, in accordance with at least one embodiment.

FIG. 5 is a block diagram that illustrates a content server, in accordance with at least one embodiment. FIG. 5 has been described in conjunction with FIG. 1. With reference to FIG. 5, there is shown the content server 110 that may include a fourth processor 502, a fourth memory 504, a fourth transceiver 506, a decryption unit 508, a content repository 510, and a fourth input/output unit 512.

The fourth processor 502 may be configured to execute one or more sets of instructions stored in the fourth memory 504. The fourth processor 502 is coupled to the fourth memory 504, the fourth transceiver 506, the decryption unit 508, the content repository 510, and the fourth input/output unit 512. The fourth processor 502 may further comprise an ALU (not shown) and a CU (not shown). The ALU may be coupled to the CU. The ALU may be configured to perform one or more mathematical and logical operations and the CU may control the operation of the ALU. The fourth processor 502 may execute a set of instructions/programs/codes/scripts stored in the fourth memory 504 to perform one or more operations for selecting the targeted content. The fourth processor 502 may be implemented based on a number of processor technologies known in the art. Examples of the fourth processor 502 may include, but are not limited to, an X86-based processor, a RISC processor, an ASIC processor, and/or a CISC processor.

The fourth memory 504 may be operable to store one or more machine codes, and/or computer programs having at least one code section executable by the fourth processor 502. The fourth memory 504 may store the one or more sets of instructions that are executable by the fourth processor 502, the fourth transceiver 506, the decryption unit 508, the content repository 510, and the fourth input/output unit 512. In an embodiment, the fourth memory 504 may include one or more fourth buffers (not shown). The one or more fourth buffers may store at least one or more decryption algorithms and the decrypted aggregated profile. Examples of some of the commonly known memory implementations may include, but are not limited to, a RAM, a ROM, an HDD, and an SD card. In an embodiment, the fourth memory 504 may include the one or more machine codes, and/or computer programs that are executable by the fourth processor 502 to perform specific operations. It will be apparent to a person having ordinary skill in the art that the one or more instructions stored in the fourth memory 504 may enable the hardware of the content server 110 to perform specific operations.

The fourth transceiver 506 transmits/receives messages and data to/from various components, such as the plurality of user-computing devices 102, the DSB 104, and the server 108, of the system environment 100, over the network 112. In an embodiment, the fourth transceiver 506 may be communicatively coupled to the network 112. In an embodiment, the fourth transceiver 506 may receive the aggregated encrypted profile from the server 108. In an embodiment, the fourth transceiver 506 may further transmit the selected targeted content to the DSB 104, over the network 112. Examples of the fourth transceiver 506 may include, but are not limited to, an antenna, an Ethernet port, a USB port, or any other port that can be configured to receive and transmit data. The fourth transceiver 506 receives and transmits the demands/content/information/notifications in accordance with the various communication protocols, such as, TCP/IP, UDP, and 2G, 3G, or 4G communication protocols.

The decryption unit 508 includes suitable logic, circuitry, and/or interfaces that are configured to execute the one or more sets of instructions stored in the fourth memory 504. The decryption unit 508 may be configured to decrypt the aggregated encrypted profile received from the server 108, over the network 112. In an embodiment, the decryption unit 508 may utilize one or more decryption algorithms known in the art for decrypting the aggregated encrypted profile. Examples of the one or more decryption algorithms may include, but are not limited to, the homomorphic decryption algorithm, the RSA decryption algorithm, and the DES decryption algorithm. In embodiment, the decryption unit 508 may utilize one or more decryption keys for decrypting the received aggregated encrypted profile. In an embodiment, the decryption unit 508 may decrypt the aggregated encrypted profile by utilizing a private key of the service provider. In an embodiment, the decryption unit 508 may include one or more electronic circuits and/or gates that are capable of decrypting the aggregated encrypted profile. The decryption unit 508 may be realized through various electronic components, such as, but not limited to, a SoC component, an ASIC component, or a FPGA component.

Though the decryption unit 508 is depicted as a separate entity, a person skilled in the art will appreciate that the scope of the disclosure is not limited to realizing functionality of the decryption unit 508 by the fourth processor 502. In an embodiment, the decryption unit 508 may be implemented within the fourth processor 502 without departing from the spirit of the disclosure. Further, a person skilled in the art will understand that the scope of the disclosure is not limited to realizing the decryption unit 508 as a hardware component. In an embodiment, the decryption unit 508 may be implemented as a software module included in computer program code (stored in the fourth memory 504), which may be executable by the fourth processor 502 to perform the functionalities of the decryption unit 508.

The content repository 510 may be operable to store one or more machine codes, and/or computer programs having at least one code section executable by the fourth processor 502. The content repository 510 may store the content from which fourth processor 502 may select the targeted content based on the decrypted aggregated profile. Examples of some of the commonly known memory implementations for the content repository 510 include, but are not limited to, a RAM, a ROM, an HDD, and an SD card.

Though the content repository 510 is depicted as a separate entity, a person skilled in the art will appreciate that the scope of the disclosure is not limited to realizing functionality of the content repository 510 by the fourth memory 504. In an embodiment, the content repository 510 may be implemented within the fourth memory 504, without departing from the spirit of the disclosure.

The fourth input/output unit 512 may comprise suitable logic, circuitry, interfaces, and/or code that may be configured to receive an input from the user to perform the one or more fourth predetermined operations. The fourth input/output unit 412 may be further configured to provide an output to the user. The fourth input/output unit 512 may be configured to communicate with the fourth processor 502. Examples of the input devices may include, but are not limited to, a keyboard, a mouse, a joystick, a touch screen, a microphone, a camera, and/or a docking station. Examples of the output devices include, but are not limited to, a display screen and/or a speaker.

Figure 6:
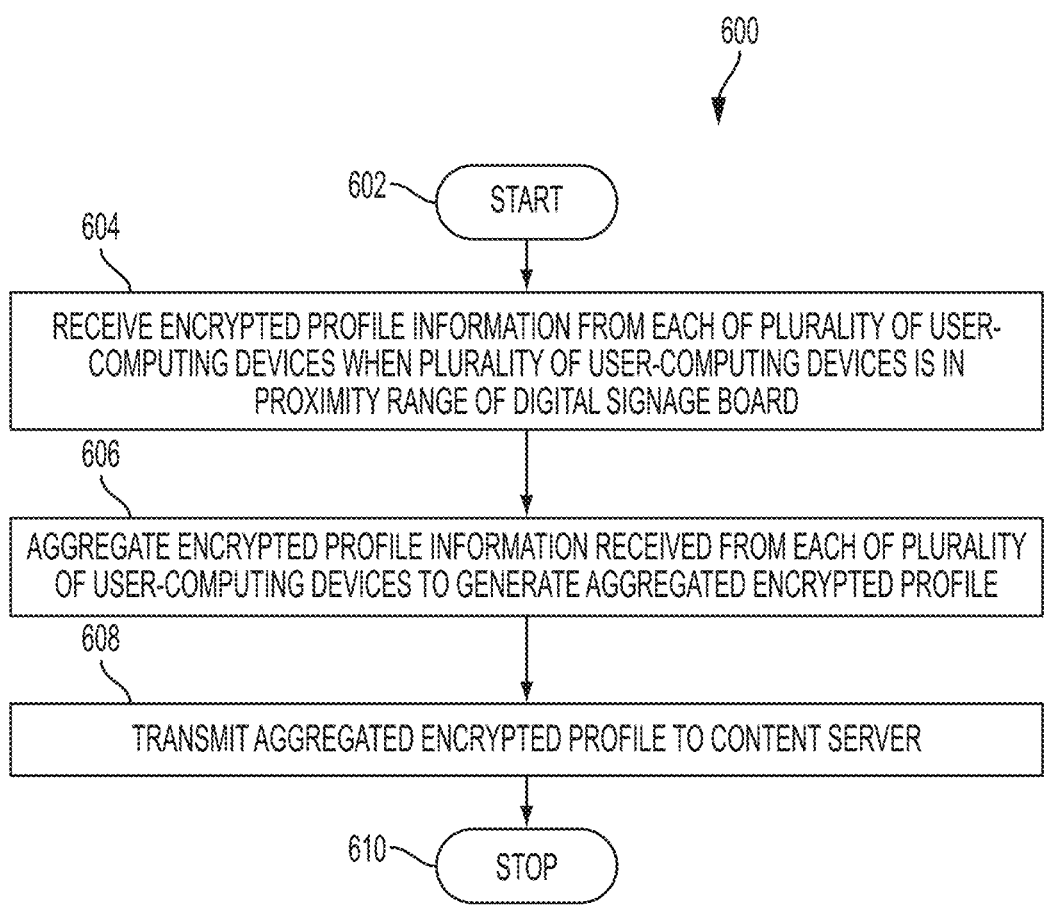
FIG. 6 is a flowchart that illustrates a method for displaying targeted content on a DSB by a server, in accordance with at least one embodiment.

FIG. 6 depicts a flowchart that illustrates a method for displaying targeted content on a DSB, in accordance with at least one embodiment. FIG. 6 is described in conjunction with FIGS. 1-5. With reference to FIG. 6, there is shown a flowchart 600 that illustrates the method for displaying the targeted content on the DSB 104 by the server 108. The method starts at step 602 and proceeds to step 604.

At step 604, the encrypted profile information is received from each of the plurality of user-computing devices 102 when the plurality of user-computing devices 102 is within the proximity range 114 of the DSB 104. In an embodiment, the second transceiver 306, in conjunction with the second processor 302, may be configured to receive the encrypted profile information from each of the plurality of user-computing devices 102. In an embodiment, the second transceiver 306 may receive the encrypted profile information when the plurality of the user-computing devices 102 is within the proximity range 114 of the DSB 104. In an embodiment, the DSB 104 may be associated with the one or more sections 106 that are within the proximity range 114 of the DSB 104. In an embodiment, the DSB 104 may be further associated with the one or more products and/or services that are available in the one or more sections 106.

In an embodiment, the third transceiver 406 may be configured to receive the encrypted profile information from each of the plurality of user-computing devices 102, based on the selection of the profile information from the user profile. In an embodiment, the corresponding user profile is stored in the first memory 204 of each of the plurality of user-computing devices 102, such as the user-computing device 102A. A person having ordinary skill in the art will understand that for brevity the storage of the user profile in the first memory 204 of each of the plurality of user-computing devices 102 is hereinafter explained with respect to the user-computing device 102A. Notwithstanding, the disclosure may not be so limited, and the storage of the user profile may be further applicable to each of the plurality of user-computing devices 102, without deviating from the scope of the disclosure.

In an embodiment, the first processor 202 may be configured to store the user profile of the user, associated with the user-computing device 102A, in the first memory 204. In an embodiment, the user profile may be stored in the first memory 204 by utilizing one or more data storage formats, such as XML format. The user profile of the user is indicative of the one or more preferences of the user towards the one or more products and/or services. In an embodiment, the user profile may comprise a static user profile and a dynamic user profile. In an embodiment, the static user profile may correspond to one or more fixed preferences that are specified by the user. The static user profile of the user may further comprise one or more of: demographic attributes, sports-related activities, and health-related information of the user associated with the user-computing device 102A. In an embodiment, the dynamic profile of the user may correspond to the one or more preferences of the user that are dependent on the one or more activities of the user towards the one or more products and/or services. In an embodiment, the dynamic user profile of the user may further comprise one or more activities of the user towards the one or more products and/or services.

In an embodiment, the first processor 202 may be configured to store the dynamic user profile by utilizing one or more taxonomy trees known in the art. Examples of the one or more taxonomy trees may include, but are not limited to, Google's product taxonomy tree and Morrison's product taxonomy tree. The taxonomy tree of the dynamic user profile comprises one or more nodes at each of a plurality of levels such that each of the one or more nodes is associated with a product and/or service from the one or more products and/or services. In an embodiment, a node in the one or more nodes may be associated with other node(s) of the one or more nodes, based on the set of rules. In an embodiment, the first processor 202 may be configured to determine the weight of each of non-leaf nodes in the one or more nodes. Further, the weight may be further determined, based on the one or more activities of the user towards the one or more products and/or services associated with the non-leaf nodes. In an embodiment, the weight is indicative of a likelihood of the user to purchase the one or more products and/or avail the one or more services. In an embodiment, the first processor 202 may be configured to update the dynamic profile of the user, based on the one or more activities of the user towards the one or more products and/or services by utilizing the set of rules.

For example, a user may utilize the user-computing device 102A to purchase a mobile phone from an online website. In this scenario, the first processor 202 may utilize the set of rules to determine a non-leaf node, such as a product "mobile phone accessories," that is associated with the non-leaf node corresponding to the product "mobile phone." Further, the first processor 202 may determine a higher weight to the non-leaf node of the product "mobile phone accessories," based on the association of the product "mobile phone" with the non-leaf node, as compared to a non-leaf node of a product "jewelry." Similarly, if a user owns a pet, the first processor 202 may determine a higher weight to a leaf-node associated with products and/or services related to "animal and pet supplies." In contrast, if a user does not own a pet, the first processor 202 may assign a lower weight to the leaf-node associated with the products and/or services related to "animal and pet supplies."

A person having ordinary skill in the art will understand that the scope of the abovementioned example is for illustrative purpose and should not be construed to limit the scope of the disclosure.

In an embodiment, the first processor 202 may further utilize the set of rules stored in the first memory 204 for determining the weights of the leaf nodes in the taxonomy tree of the dynamic user profile. In an embodiment, the first processor 202 may determine the weight of a leaf node, based on the weight of the non-leaf nodes associated with the leaf node.

In an embodiment, the profile information may be selected from the user profile, based on the metadata received from the DSB 104.

In an embodiment, the second transceiver 306 may be configured to transmit the metadata to the plurality of user-computing devices 102 when the plurality of user-computing devices 102 is within the proximity range 114 of the DSB 104. In an embodiment, the second sensing unit 308 may be configured to detect the presence of the plurality of user-computing devices 102 when the plurality of user-computing devices 102 is within the proximity range 114. In an embodiment, the proximity range 114 of the DSB 104 may depend on the type of sensors installed in the second sensing unit 308 of the DSB 104. For example, if the second sensing unit 308 has a Bluetooth sensor, then the proximity range 114 may be less than or equal to "330 ft." In an embodiment, the second sensing unit 308 may detect the presence of the plurality of user-computing devices 102, if the plurality of the first sensing unit 210 follows the same communication protocol as the second sensing unit 308.

In an embodiment, the second sensing unit 308 may be configured to detect the presence of each of the plurality of user-computing devices 102 when each of the plurality of user-computing devices 102 remains within the proximity range 114 of the DSB 104 for a pre-specified time interval. For example, the second sensing unit 308 may detect the presence of the user-computing device 102A within the proximity range 114 when the user-computing device 102A remains within the proximity range 114 for "15 seconds."

A person having ordinary skill in the art will understand that the scope of the abovementioned example is for illustrative purpose and should not be construed to limit the scope of the disclosure.

After detecting the presence of the plurality of user-computing devices 102, the second transceiver 306 may be configured to transmit the metadata to each of the plurality of user-computing devices 102. In an embodiment, the metadata may comprise the unique identification of the DSB 104, the geographical location coordinates of the DSB 104, and the information pertaining to the proximity range 114 of the DSB 104. In an embodiment, the first transceiver 206 in each of the plurality of user-computing devices 102 may receive the metadata. Further, the first processor 202 in each of the plurality of user-computing devices 102 may be configured to select the profile information from the user profile based on the metadata.

A person having ordinary skill in the art will understand that for brevity the selection of the profile information from the user profile is hereinafter explained with respect to the user-computing device 102A. Notwithstanding, the disclosure may not be so limited, and the selection of the profile information from the user profile may be further applicable to each of the plurality of user-computing devices 102, without deviating from the scope of the disclosure.

Based on the geographical location of the DSB 104 and the information pertaining to the proximity range 114 of the DSB 104 in the metadata, the first processor 202 may identify the one or more products and/or services associated with the DSB 104 from the map data stored in the first memory 204. In an embodiment, the map data may be stored in a database server (not shown). Further, the first transceiver 206 may be configured to query the database server to extract the map data for identifying the one or more products and/or services associated with the DSB 104.

For example, based on the received metadata, the first processor 202 may determine a geographical area that is associated with the DSB 104. Thereafter, by utilizing the map data, the first processor 202 may identify the one or more products and/or services that are available in the geographical area associated with the DSB 104. Thereafter, the first processor 202 may extract the information pertaining to the products and/or services, such as identification codes of the products and/or services in form of Xpath expressions, associated with the DSB 104 from the map data.

In an alternate embodiment, the DSB 104 may transmit the information pertaining to the identification codes, such as the Xpath expressions, of the associated products and/or services, in the metadata, to the user-computing device 102A.

After the extraction/reception of the information pertaining to identification codes of the one or more products and/or services, the first processor 202 may be configured to select the profile information from the user profile. For example, the first processor 202 may be configured to match the Xpath expressions of the products and/or services with the XML format of the products and/or services in the user profile. Thereafter, based on the match between the Xpath expressions and the XML format the first processor 202 may select the profile information from the user profile.

A person having ordinary skill in the art will understand that the abovementioned example is for illustrative purpose and should not be construed to limit the scope of the disclosure.

After the selection of the profile information, the encryption unit 208 may be configured to encrypt the profile information. The encryption unit 208 may utilize the one or more encryption algorithms known in the art for encrypting the profile information. Examples of the one or more encryption algorithms may include, but are not limited to, the homomorphic encryption algorithm, the RSA encryption algorithm, and the DES encryption algorithm. In an embodiment, for encrypting the profile information, the encryption unit 208 may utilize equation 1, as shown below:

$$C_X = E_{PK}(P_X) \quad (1)$$

where, $P_X$ represents the selected profile information;

$E_{PK}$ represents an encryption key, such as the public key of a service provider; and $C_X$ represents the encrypted profile information.

For example, the encryption unit 208 may utilize the public key "$E_{PK}$" of a service provider to encrypt the profile information, such as "$P_A$," to generate the encrypted profile information, such as "$C_A$."

In an embodiment, the encrypted profile information may further comprise encrypted static profile information and encrypted dynamic profile information. Thereafter, the first transceiver 206 in each of the plurality of user-computing devices 102 may be configured to transmit the selected encrypted profile to the server 108.

Thereafter, the third transceiver 406 may be configured to receive the selected encrypted profile information from each of the plurality of user-computing devices 102. In an embodiment, the received encrypted profile information from each of the plurality of user-computing devices 102 may be associated with the unique identification of the DSB 104 that transmitted the metadata to each of the plurality of user-computing devices 102.

At step 606, the encrypted profile information received from each of the plurality of user-computing devices 102 is aggregated. In an embodiment, the aggregation unit 408, in conjunction with the third processor 402, may be configured to aggregate the encrypted profile information received from each of the plurality of user-computing devices 102. In an embodiment, the aggregation unit 408 may utilize the one or more aggregation techniques known in the art for the aggregation of the encrypted profile information received from each of the plurality of user-computing devices 102. Examples of the one or more aggregation techniques may include, but not limited to, homomorphic aggregation and/or binary aggregation. In an embodiment, for aggregating the encrypted profile information received from each of the plurality of user-computing devices 102, the aggregation unit 408 may utilize equation 2, as shown below:

$$C = E_{PK}(P_A + P_B + P_C + \ldots P_N) \quad (2)$$

where, $E_{PK}$ represents an encryption key, such as the public key of the service provider;

$P_A, P_B, P_C, \ldots, P_N$ represents the profile information selected from each of the plurality of user-computing devices; and C represents the aggregated encrypted profile.

For example, the aggregation unit 408 may aggregate the encrypted profile information, such as "$C_A$" (i.e., "$E_{PK}(P_A)$"), "$C_B$" (i.e., "$E_{PK}(P_B)$"), "$C_C$" (i.e., "$E_{PK}(P_C)$"), and "$C_E$" (i.e., "$E_{PK}(P_E)$"), received from each of the plurality of user-computing devices 102 to generate the aggregated encrypted profile, such as "C" (i.e., "$E_{PK}(P_A+P_B+P_C+P_E)$").

In an embodiment, the aggregation unit 408 may be configured to aggregate the encrypted static profile information from each of the plurality of user-computing devices 102 by utilizing a binary aggregation technique. For example, the encrypted static profile information from the user-computing device 102A may be "$SP_1$" and the encrypted static profile information from the user-computing device 102B may be "$SP_2$" (i.e., $SP_1=\{1, 0, 0, 1, 1, 0, 1\}$ and $SP_2=\{1, 1, 0, 0, 1, 0, 0\}$). The aggregation unit 408 may perform an "OR" operation on the received encrypted static profile information from the user-computing device 102A and the user-computing device 102B. Thus, the aggregated encrypted static profile may be $SP_a=\{1, 1, 0, 1, 1, 0, 1\}$.

In an embodiment, the aggregation unit 408 may be further configured to aggregate the encrypted dynamic profile information from each of the plurality of user-computing devices 102 based on the weight of each node in the encrypted dynamic profile information. For example, corresponding to products, such as "watches," "smartphones," "groceries" and "sports equipment," the weights in the encrypted dynamic profile from the user-computing device 102A may be "$DP_1$" and the weights in the encrypted dynamic profile from the user-computing device 102B may be "$DP_2$" such that $DP_1=\{0.67, 0.34, 0.24, 0.89\}$ and $DP_2=\{0.37, 0.94, 0.14, 0.79\}$. In this scenario, the aggregation unit 408 may utilize the one or more aggregation algorithms to generate the aggregated encrypted dynamic profile as $DP_a=\{0.52, 0.64, 0.19, 0.84\}$.

In an embodiment, the aggregated encrypted profile may be a combination of the aggregated encrypted static profile and the aggregated encrypted dynamic profile. For example, the aggregated encrypted profile "C" may be a combination of the aggregated encrypted static profile "$SP_a$" and the aggregated encrypted dynamic profile "$DP_a$" (i.e., C={{1, 1, 0, 1, 1, 0, 1}, {0.52, 0.64, 0.19, 0.84}}.

In an embodiment, the aggregation unit 408 may aggregate the encrypted profile information, received from each of the plurality of user-computing devices 102, based on the unique identification of the DSB 104 that is associated with the encrypted profile information. For example, the third transceiver 406 may receive the encrypted profile information from four user-computing devices, such as user-computing devices 102A to 102D. The encrypted profile information from the user-computing devices 102A and 102D may be associated with the unique identification, such as "DSB_1," and the encrypted profile information from the user-computing devices 102B and 102C may be associated with the unique identification, such as "DSB_2." In this scenario, the aggregation unit 408 may aggregate the encrypted profile information from the user-computing devices 102A and 102D to generate the aggregated encrypted profile "$C_1$." Further, the aggregation unit 408 may aggregate the encrypted profile information from the user-computing devices 102B and 102C to generate the aggregated encrypted profile "$C_2$."

A person having ordinary skill in the art will understand that the scope of the abovementioned example is for illustrative and should not be construed to limit the scope of the disclosure.

At step 608, the aggregated encrypted profile is transmitted to the content server 110. In an embodiment, the third transceiver 406, in conjunction with the third processor 402, may be configured to transmit the aggregated encrypted profile to the content server 110, over the network 112. The content server 110 may be configured to receive the aggregated encrypted profile and decrypt the aggregated encrypted profile. In an embodiment, based on the decrypted aggregated profile, the content server 110 may be configured to select the targeted content. Further, the selected targeted content may be displayed on the DSB 104. Control passes to the end step 610.

The method to decrypt the aggregated encrypted profile for the selection of the targeted content has been explained later in FIG. 7.

Figure 7:
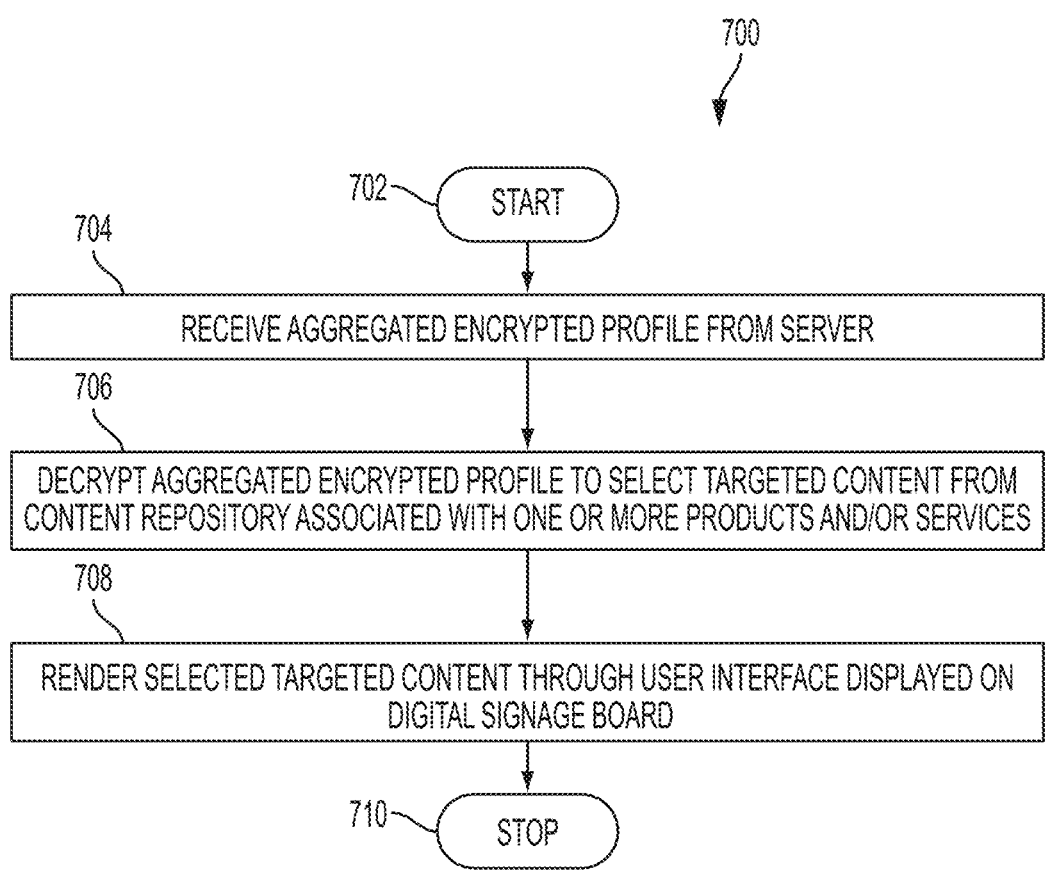
FIG. 7 is a flowchart that illustrates a method for displaying targeted content on a DSB by a content server, in accordance with at least one embodiment.

FIG. 7 depicts a flowchart that illustrates a method for displaying targeted content on a DSB, in accordance with at least one embodiment. FIG. 7 is described in conjunction with FIGS. 1-6. With reference to FIG. 7, there is shown a flowchart 700 that illustrates the method for displaying the targeted content on the DSB 104 by the content server 110. The method starts at step 702 and proceeds to step 704.

At step 704, the aggregated encrypted profile from the server 108 is received. In an embodiment, the fourth transceiver 506, in conjunction with the fourth processor 502, may be configured to receive the aggregated encrypted profile from the server 108, over the network 112. Prior to the reception of the aggregated encrypted profile, the server 108 may be configured to generate the aggregated encrypted profile, based on the selected encrypted profile information received from each of the plurality of user-computing devices 102. The selection of the encrypted profile information and the aggregation of the selected encrypted profile information have been explained in steps 604 and 606, respectively, of FIG. 6.

At step 706, the aggregated encrypted profile is decrypted to select the targeted content, from the content repository 510, associated with the one or more products and/or services. In an embodiment, the decryption unit 508, in conjunction with the fourth processor 502, may be configured to decrypt the aggregated encrypted profile. In an embodiment, the decryption unit 508 may utilize the one or more decryption algorithms (known in the art) for the decryption of the aggregated encrypted profile. In an embodiment, the decryption unit 508 may use a decryption algorithm that is compatible with the encryption algorithm, utilized by the encryption unit 208, to decrypt the aggregated encrypted profile. In an embodiment, for decrypting the aggregated encrypted profile, the decryption unit 508 may utilize equation 3, as shown below:

$$P = D_{SK}(C) \quad (3)$$

where,

C represents the aggregated encrypted profile;

$D_{SK}$ represents a decryption key, such as the private key of the service provider; and P represents the decrypted aggregated profile.

For example, the encryption unit 208 may encrypt the profile information by utilizing a public key, such as "$E_{PK}$," of a service provider. In this scenario, the decryption unit 508 may utilize a private key, such as "$D_{SK}$," of the service provider to decrypt the aggregated encrypted profile. In an embodiment, the decrypted aggregated profile may represent aggregated preferences of the users, towards the one or more products and/or services, associated with the plurality of user-computing devices 102.

After the decryption of the aggregated encrypted profile, the fourth processor 502 may utilize the decrypted aggregated profile to select the targeted content from the content repository 510. In an embodiment, the selected targeted content may be associated with the one or more products and/or services that are associated with the decrypted aggregated profile. In an embodiment, the selected targeted content may include one or more advertisements, offers, discounts, and/or coupons associated with the one or more products and/or services.

For example, the decrypted aggregated profile may be associated with four products, such as "watches," "smartphones," "groceries," and "sports equipment," and two services, such as "healthcare" and "finance." Further, the content repository 510 may comprise content pertaining to five products, such as "watches," "smartphones," "groceries," "sports equipment," "animal and pet supplies," and "clothing" and three services, such as "education," "healthcare," and "finance." Thus, the fourth processor 502 may select the content associated with the products, such as "watches," "smartphones," "groceries," and "sports equipment," and the services, such as "healthcare" and "finance" from the content repository 510. The selected content corresponds to the targeted content.

In another embodiment, the fourth processor 502 may further select the targeted content, based on a profitability factor associated with the targeted content and/or a pre-specified count. In an embodiment, the profitability factor may be determined, based on a difference between a cost associated with the content and revenue generated by the content. In an embodiment, the fourth processor 502 may select a pre-specified count of the targeted content that has the maximum profitability factor. For example, the pre-specified count may be "4." The fourth processor 502 may select the content associated with the products, such as "watches," "smartphones," "groceries," and "sports equipment," and the services, such as "healthcare" and "finance." The profitability factor associated with each of the selected content may be "watches: 30%," "smartphones: 33%," "groceries: 60%," "sports equipment: 73%," "healthcare: 67%" and "finance: 42%." In this scenario, the fourth processor 502 may select "sports equipment," "healthcare," "groceries," and "finance" as the targeted content, based on the pre-specified count "4" and the profitability factor.

A person having ordinary skill in the art will understand that the scope of the abovementioned example is for illustrative purpose and should not be construed to limit the scope of the disclosure.

At step 708, the selected targeted content is rendered through a user-interface that is displayed on the DSB 104. In an embodiment, the fourth transceiver 506, in conjunction with the fourth processor 502, may be configured to render the selected targeted content through the user interface on the DSB 104. In an embodiment, the fourth transceiver 506 may be configured to transmit the selected targeted content to the DSB 104. After the reception of the targeted content, the second input/output unit 310 may display the received targeted content to a plurality of users associated with the plurality of user-computing devices 102. And the control passes to the end step 710.

Figure 8A:
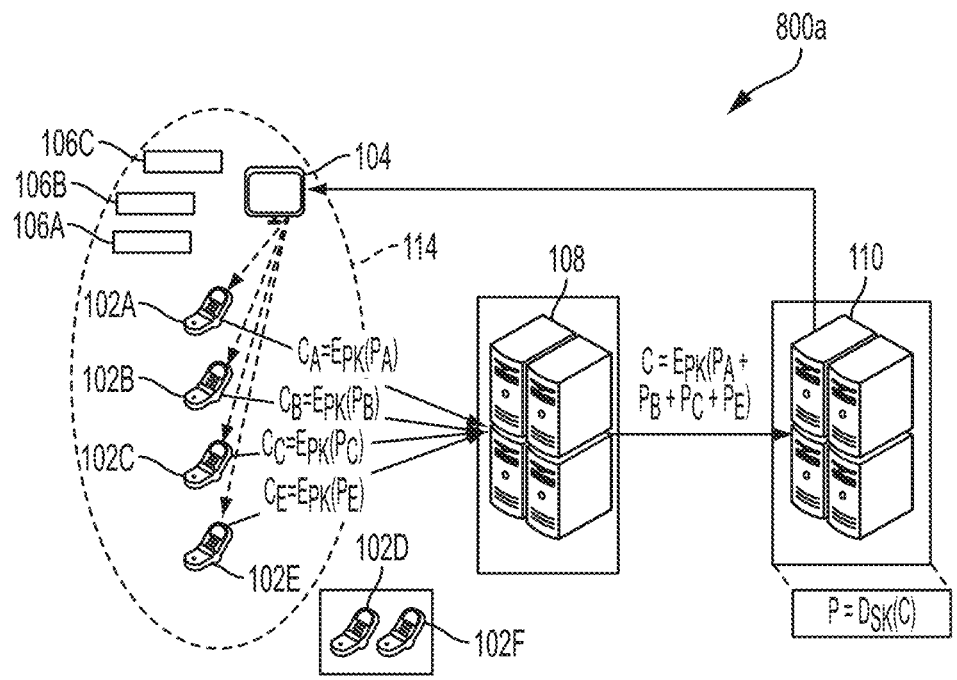
FIGS. 8A and 8B, collectively illustrates an exemplary scenario for displaying targeted content on a DSB, in accordance with at least one embodiment.
Figure 8B:
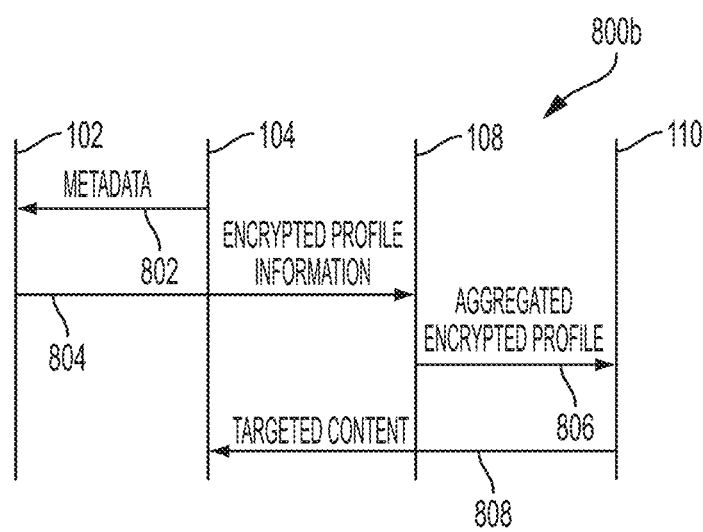

FIGS. 8A and 8B collectively illustrates an exemplary scenario for displaying the targeted content on a DSB, in accordance with at least one embodiment. FIGS. 8A and 8B have been explained in conjunction with FIGS. 1-7. With reference to FIGS. 8A and 8B, there are shown exemplary scenarios 800a and 800b, respectively, for displaying the targeted content on the DSB 104.

The user-computing devices 102A, 102B, 102C and 102E of the plurality of user-computing devices 102 may be within the proximity range 114 of the DSB 104. The user-computing devices 102A, 102B, 102C and 102E may remain within the proximity range 114 for the pre-specified time interval (e.g., "15 seconds"). Further, other user-computing devices 102D and 102F of the plurality of user-computing devices 102 may be out of the proximity range 114 of the DSB 104. Thereafter, the DSB 104 may detect the presence of the user-computing devices 102A, 102B, 102C and 102E by utilizing one or more communication protocols, such as an NFC protocol. In an embodiment, the DSB 104 may not detect the presence of the other user-computing devices 102D and 102F. Further, the DSB 104 may transmit the metadata (transmission of the metadata is depicted by message flow step 802 in FIG. 8B) to each of the user-computing devices 102A, 102B, 102C and 102E within the proximity range 114 of the DSB 104. The DSB 104 may be associated with the one or more products and/or services, such as "watches," "groceries," "apparels" and "sports equipment," such that the one or more products and/or services are available in one or more sections 106 (i.e., sections 106A, 106B, and 106C) that lie within the proximity range 114 of the DSB 104.

Based on the received metadata, each of the user-computing devices 102A, 102B, 102C and 102E selects the encrypted profile information, such as "$C_A$," "$C_B$," "$C_C$," and "$C_E$," from the encrypted user profile stored at each of the user-computing devices 102A, 102B, 102C and 102E. The encrypted profile information is selected from the user profile, based on the association of the DSB 104 with the one or more products and/or services. In an embodiment, each of the plurality of user-computing devices 102 may encrypt the user profile and the selected profile information (i.e., "$P_A$," "$P_B$," "$P_C$," and "$P_E$") by utilizing an encryption key, such as "$E_{PK}$," based on equation 1, as expressed in FIG. 6. Thereafter, the encrypted profile information (i.e., "$C_A$," "$C_B$," "$C_C$," and "$C_E$") from corresponding user-computing devices 102A, 102B, 102C and 102E, is transmitted to the server 108 (transmission of the encrypted profile information is depicted by message flow step 804, in FIG. 8B). The server 108 may aggregate the encrypted profile information, received from each of the plurality of user-computing devices 102, to generate the aggregated encrypted profile, such as "C," based on equation 2, as expressed in FIG. 6.

Thereafter, the server 108 may transmit the aggregated encrypted profile, such as "C," to the content server 110 (transmission of the aggregated encrypted profile is depicted by message flow step 806 in FIG. 8B). The content server 110 may decrypt the received aggregated encrypted profile, such as "C." In an embodiment, the content server 110 may decrypt the aggregated encrypted profile by utilizing a decryption key, such as "$D_{SK}$," based on equation 3, as expressed in FIG. 6. Further, based on the decrypted aggregated profile, such as "P," the content server 110 may select the targeted content from the content repository 510 in the content server 110. The selected targeted content is further associated with the one or more products and/or services (i.e., "watches," "groceries," "apparels" and "sports equipment") that are associated with the DSB 104.

After the selection of the targeted content, the content server 110 may transmit the targeted content to the DSB 104 (transmission of the targeted content is depicted by message flow step 808 in FIG. 8B). The transmitted targeted content is rendered through the user interface that is displayed on the DSB 104. Each of the plurality of users associated with the plurality of user-computing devices 102 is able to view the targeted content displayed on the DSB 104.

A person having ordinary skill in the art will understand that the abovementioned exemplary scenario is for illustrative purpose and should not be construed to limit the scope of the disclosure.

The disclosed embodiments encompass numerous advantages. The disclosure provides a method and a system displaying targeted content on a digital signage board (DSB). The disclosed methods and systems may enable the secure transmission of the profile information of one or more users between various devices. One or more sections in one or more shopping complexes may utilize the disclosed method and system to display targeted content on a DSB. Further, the one or more sections in the shopping complex are oblivious to details, such as user profile, pertaining to a single user in the one or more users. Thus, the disclosed method and system preserves the confidentiality and privacy of the one or more users. Such a method minimizes the chances of the private and sensitive information of the one or more users being revealed. The disclosed method and system may enable the one or more sections to display targeted content on the DSB, based on consolidated preferences of the one or more users. Thus, the cost and expected revenue generated from the targeted content being displayed on the DSB is optimized. Further, the selection of the targeted content is based on a part of the user profile that is associated with the one or more products and/or service, thus, reducing the payload size of the information being transmitted.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be an HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for displaying targeted content on a DSB have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for displaying targeted content on a digital signage board (DSB), the method comprising:

receiving, by one or more transceivers in a server, a plurality of encrypted profiles comprising encrypted static user profile information and encrypted dynamic user profile information from a plurality of user-computing devices, the encrypted profiles selected based on stored map data pertaining to one or more products and/or services available in at least one section of a proximity range of the DSB, in response to the plurality of user-computing devices being in the proximity range of the DSB, wherein the DSB is associated with the one or more products and/or services available within the proximity range;

aggregating, by one or more processors in the server, profile information from each of the encrypted profiles received from the plurality of user-computing devices into an aggregated encrypted profile based on a unique identification of the DSB associated with the user-computing devices, the aggregated encrypted profile representing consolidated statistical data associated with each user of the plurality of user-computing devices in the proximity range, wherein the encrypted dynamic user profile information is aggregated based on a weight of each of one or more activities of the user towards the one or more products and/or services, wherein the weight is indicative of a likelihood of the user to purchase the one or more products and/or avail the one or more services; and transmitting, by the one or more transceivers in the server, the aggregated encrypted profile to a content server, wherein the content server decrypts the aggregated encrypted profile to select the targeted content from a content repository associated with the one or more products and/or services based on the aggregated profile information, wherein the targeted content is displayed on the DSB.

2. The method of claim 1, wherein the targeted content includes at least one or more advertisements, offers, discounts, and coupons associated with the one or more products and/or services.

3. The method of claim 1, wherein the profile information is selected from encrypted user profiles from the plurality of user-computing devices, based on the association of the DSB with the one or more products and/or services, wherein each of the plurality of user-computing devices encrypts a corresponding user profile to generate the encrypted user profiles.

4. The method of claim 3, wherein the profile information is selected from the encrypted user profiles from the plurality of user-computing devices by use of an r-tree.

5. The method of claim 3, wherein the static user profile comprises one or more of: demographic attributes, sports-related activities, and health-related information of a user associated with each of the plurality of user-computing devices.

6. The method of claim 1, wherein the encrypted static profile information from the plurality of user-computing devices is aggregated based on a binary aggregation technique.

7. A method for displaying targeted content on a digital signage board (DSB), the method comprising:
receiving, by one or more transceivers in a content server, an aggregated encrypted profile from a server, wherein the aggregated encrypted profile comprises encrypted static user profile information and encrypted dynamic user profile information received from a plurality of user profiles of a plurality of user-computing devices, the encrypted profiles selected based on stored map data pertaining to one or more products and/or services available in at least one section of a proximity range of the DSB, in response to the plurality of user-computing devices being in the proximity range of the DSB, the aggregated encrypted profile based on a unique identification of the DSB associated with the plurality of user-computing devices, the aggregated encrypted profile representing consolidated statistical data associated with each user of the plurality of user-computing devices, wherein the DSB is associated with the one or more products and/or services available within the proximity range, wherein the encrypted dynamic user profile information is aggregated based on a weight of each of one or more activities of the user towards the one or more products and/or services, wherein the weight is indicative of a likelihood of the user to purchase the one or more products and/or avail the one or more services;
decrypting, by one or more processors in the content server, the aggregated encrypted profile to select the targeted content from a content repository associated with the one or more products and/or services; and
rendering, by the one or more processors in the content server, the selected targeted content through a user interface displayed on the DSB.

8. The method of claim 7, wherein the selection of the targeted content is based on at least a profitability factor associated with the targeted content.

9. A system of displaying targeted content on a digital signage board (DSB), the system comprising:
one or more processors in a server configured to:
receive encrypted profiles comprising encrypted static user profile information and encrypted dynamic user profile information, by utilizing one or more transceivers in the server, from a plurality of user-computing devices, the encrypted profiles selected based on stored map data pertaining to one or more products and/or services available in at least one section of a proximity range of the DSB, in response to the plurality of user-computing devices being in the proximity range of the DSB, wherein the DSB is associated with the one or more products and/or services available within the proximity range;
aggregate profile information from each of the encrypted profiles received from the plurality of user-computing devices into an aggregated encrypted profile based on a unique identification of the DSB associated with the user-computing devices, the aggregated encrypted profile representing consolidated statistical data associated with each user of the plurality of user-computing devices in the proximity range, wherein the encrypted dynamic user profile information is aggregated based on a weight of each of one or more activities of the user towards the one or more products and/or services, wherein the weight is indicative of a likelihood of the user to purchase the one or more products and/or avail the one or more services; and
transmit the aggregated encrypted profile to a content server by utilizing the one or more transceivers in the server, wherein the content server decrypts the aggregated encrypted profile to select the targeted content from a content repository associated with the one or more products and/or services based on the aggregated profile information, wherein the targeted content is displayed on the DSB.

10. The system of claim 9, wherein the targeted content includes at least one or more advertisements, offers, discounts, and coupons associated with the one or more products and/or services.

11. The system of claim 9, wherein the profile information is selected from encrypted user profiles from the plurality of user-computing devices, based on the association of the DSB with the one or more products and/or services, wherein each of the plurality of user-computing devices encrypts a corresponding user profile to generate the encrypted user profiles.

12. The system of claim 11, wherein the static user profile comprises one or more of: demographic attributes, sports-related activities, and health-related information of a user associated with each of the plurality of user-computing devices.

13. The system of claim 11, wherein the encrypted static profile information from the plurality of user-computing devices is aggregated based on a binary aggregation technique.

14. A system of displaying targeted content on a digital signage board (DSB), the system comprising:
one or more processors in a content server configured to:
receive an aggregated encrypted profile based on a unique identification of the DSB associated with a plurality of user-computing devices, the aggregated encrypted profile representing consolidated statistical data associated with each user of the plurality of user-computing devices, from a server by utilizing one or more transceivers in the content server, wherein the aggregated encrypted profile comprises static user profile information and dynamic user profile information received from a plurality of encrypted user profiles from the plurality of user-computing devices, the encrypted profiles selected based on stored map data pertaining to one or more products and/or services available in at least one section of a proximity range of the DSB, to generate the aggregated encrypted profile in response to the plurality of user-computing devices being in the proximity range of the DSB, wherein the DSB is associated with the one or more products and/or services, wherein the dynamic user profile information is aggregated based on a weight of each of one or more activities of the user towards the one or more products and/or services, and the weight is indicative of a likelihood of the user to purchase the one or more products and/or avail the one or more services;

decrypt the aggregated encrypted profile to select the targeted content from a content repository associated with the one or more products and/or services; and render the selected targeted content through a user interface displayed on the DSB.

15. A computer program product for use with a computer, the computer program product comprising a non-transitory computer readable medium, wherein the non-transitory computer readable medium stores a computer program code for displaying targeted content on a digital signage board (DSB), wherein the computer program code is executable by one or more processors in a server to:

receive encrypted profiles comprising static user profile information and dynamic user profile information, by utilizing one or more transceivers in the server, from a plurality of user-computing devices, the encrypted profiles selected based on stored map data pertaining to one or more products and/or services available in at least one section of a proximity range of the DSB, in response to the plurality of user-computing devices being in the proximity range of the DSB, wherein the DSB is associated with the one or more products and/or services available within the proximity range;

aggregate profile information from each of the encrypted profiles received from the plurality of user-computing devices into an aggregated encrypted profile based on a unique identification of the DSB associated with the user-computing devices, the aggregated encrypted profile representing consolidated statistical data associated with each user of the plurality of user-computing devices in the proximity range, wherein the encrypted dynamic user profile information from the plurality of user-computing devices is aggregated based on a weight of each of one or more activities of the user towards the one or more products and/or services, wherein the weight is indicative of a likelihood of the user to purchase the one or more products and/or avail the one or more services; and transmit the aggregated encrypted profile to a content server by utilizing the one or more transceivers in the server, wherein the content server decrypts the aggregated encrypted profile to select the targeted content from a content repository associated with the one or more products and/or services based on the aggregated profile information, wherein the targeted content is displayed on the DSB.

16. A computer program product for use with a computer, the computer program product comprising a non-transitory computer readable medium, wherein the non-transitory computer readable medium stores a computer program code for displaying targeted content on a digital signage board (DSB), wherein the computer program code is executable by one or more processors in a content server to:

receive an aggregated encrypted profile from a server by utilizing one or more transceivers in the content server, the aggregated encrypted profile based on a unique identification of the DSB associated with the user-computing devices, the aggregated encrypted profile representing consolidated statistical data associated with each user of the plurality of user-computing devices, wherein the aggregated encrypted profile comprises static user profile information and dynamic user profile information received from a plurality of encrypted profiles from a plurality of user-computing devices, the encrypted profiles selected based on stored map data pertaining to one or more products and/or services available in at least one section of a proximity range of the DSB in response to the plurality of user-computing devices being in the proximity range of the DSB, wherein the DSB is associated with the one or more products and/or services, wherein the dynamic user profile information is aggregated based on a weight of each of one or more activities of the user towards the one or more products and/or services, and the weight is indicative of a likelihood of the user to purchase the one or more products and/or avail the one or more services;

decrypt the aggregated encrypted profile to select the targeted content from a content repository associated with the one or more products and/or services; and render the selected targeted content through a user interface displayed on the DSB.

\* \* \* \* \*